(12) United States Patent
Gaikwald et al.

(10) Patent No.: US 7,738,357 B2
(45) Date of Patent: Jun. 15, 2010

(54) APPARATUS AND METHOD FOR CARRIER FREQUENCY OFFSET ESTIMATION AND CORRECTION IN A WIRELESS COMMUNICATION SYSTEM

(75) Inventors: Rohit V. Gaikwald, San Diego, CA (US); Rajendra T. Moorti, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 1203 days.

(21) Appl. No.: 11/312,512

(22) Filed: Dec. 21, 2005

(65) Prior Publication Data
US 2006/0285478 A1 Dec. 21, 2006

Related U.S. Application Data

(60) Provisional application No. 60/691,279, filed on Jun. 17, 2005.

(51) Int. Cl.
*H04J 11/00* (2006.01)
(52) U.S. Cl. .................... 370/208; 375/331
(58) Field of Classification Search ......... 370/203–211, 370/281, 295, 319, 324, 343, 350, 389; 375/329, 375/341, 344, 362, 365, 331, 233, 324, 330, 375/335, 215, 294, 327, 375
See application file for complete search history.

(56) References Cited

U.S. PATENT DOCUMENTS

| | | | |
|---|---|---|---|
| 6,522,703 B1 | 2/2003 | Cueff et al. | |
| 6,738,375 B1* | 5/2004 | Okanoue | 370/389 |
| 7,139,340 B2* | 11/2006 | Scarpa | 375/344 |
| 7,308,053 B2* | 12/2007 | Yousef et al. | 375/344 |

\* cited by examiner

*Primary Examiner*—Steven H Nguyen
*Assistant Examiner*—Vinncelas Louis
(74) *Attorney, Agent, or Firm*—Sterne, Kessler, Goldstein & Fox P.L.L.C.

(57) ABSTRACT

A method is disclosed for correcting carrier frequency offset (CFO) in a received data packet that includes one or more M data streams. The data packet has a payload portion preceded by a preamble portion, the payload portion having a plurality of data symbols (L) each of which include a plurality of data tones (K). The method comprises, making a per-stream preamble CFO estimate for each data stream by correlating repeated preamble portions that precede the data packet. The per-stream preamble CFO estimates are weighted and averaged to obtain a single preamble CFO estimate. Any CFO in each received data stream is then corrected according to the preamble CFO estimate. Additionally, for an $l^{th}$ data symbol in a data packet, a per-tone CFO estimate is derived and successively averaged over frequency (tones), time (symbols) and space (data steams) to derive data CFO estimate $p_{data}$. Any CFO in each received data stream may be corrected according to the data CFO estimate, and/or the preamble CFO estimate.

7 Claims, 6 Drawing Sheets

APPARATUS AND METHOD FOR CARRIER FREQUENCY OFFSET ESTIMATION AND CORRECTION IN A WIRELESS COMMUNICATION SYSTEM

CROSS-REFERENCE TO RELATED APPLICATION

This application claims the benefit of U.S. Provisional Patent Application 60/691,279, filed Jun. 17, 2005, which is incorporated by reference herein in its entirety.

BACKGROUND OF THE INVENTION

1. Field of the Invention

The invention is generally related to the correction of certain signal impairments in a wireless communication system. More specifically, the invention is directed to the estimation and correction of carrier frequency offset, sampling frequency offset, and phase noise in a wireless communication system.

2. Background

A wireless communication system will typically employ at least one transmitter/receiver pair between which data carrying signals are exchanged. In such a wireless system, the transmitter is typically responsible for encoding the digital information and modulating it onto an analog carrier signal (e.g., a radio signal). Subsequently, the receiver demodulates and decodes the digital information. There are many known techniques for the modulation and demodulation of digital information sent via analog carrier signals.

Regardless of the specific modulation technique used in a given wireless system, the analog carrier signal is subject to certain impairments or degradations during the modulation-transmission-demodulation cycle. Such impairments manifest themselves in a variety of ways including carrier frequency offset (CFO) and sampling frequency offset (SFO). Phase noise is an additional impairment. These impairments, if left uncorrected, can result in corruption of the digital information.

As modulation techniques grow ever more sophisticated, the complexity, speed and sensitivity of wireless communication systems are constantly pushed to the limit. It would be beneficial, then, to continually seek improvements in the estimation and correction of CFO, SFO, phase noise and other such impairments to wireless communication signals.

BRIEF DESCRIPTION OF THE DRAWINGS/FIGURES

The accompanying drawings, which are included to provide a further understanding of the invention, are incorporated in and constitute part of this specification. Together with the description, they serve to provide examples of implementation of the invention. In the drawings:

FIG. 1 illustrates the physical layer of receiver in a wireless communication system.

FIG. 2 more specifically illustrates a portion of the physical layer wherein embodiment of the present invention may operate.

Figure 1:
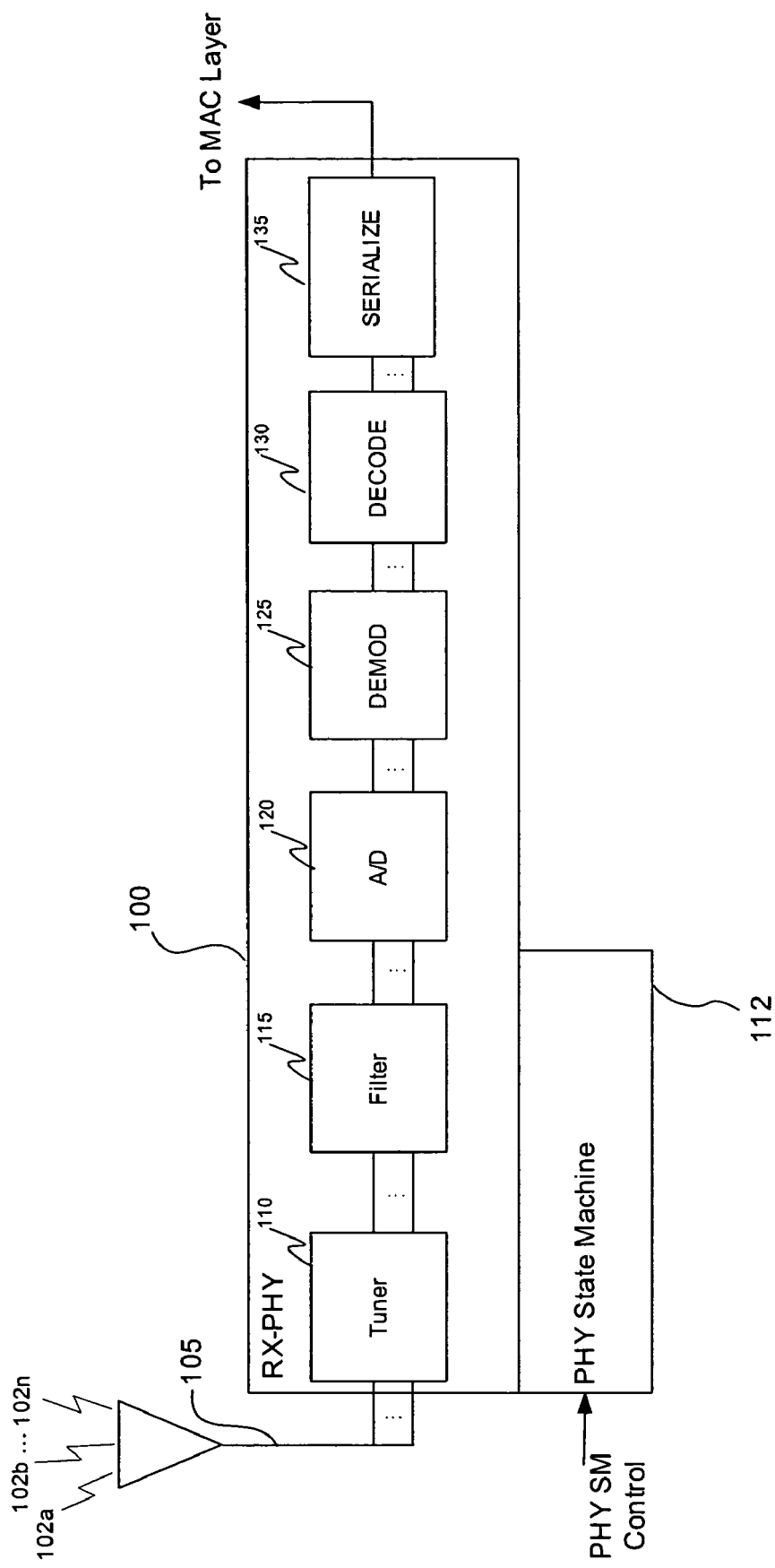

The present invention will now be described with reference to the accompanying drawings. In the drawings, like reference numbers indicate identical or functionally similar elements. Additionally, the leftmost digit or digits of a reference number identify the figure in which the reference number first appears.

DETAILED DESCRIPTION OF THE INVENTION

I. Overview of an Exemplary Operating Environment

While the present invention is described herein with reference to illustrative embodiments for particular applications, it should be understood that the invention is not limited thereto. Those skilled in the art with access to the teachings provided herein will recognize additional modifications, applications, and embodiments that fall within the scope of the claims, and additional fields in which the invention would be of significant utility.

For example, the invention will be described herein in the context of a wireless local area network (WLAN) that uses orthogonal frequency division modulation (OFDM). This exemplary environment was selected because OFDM is a common modulation technique, and is used in the IEEE 802.11a/b/g standards promulgated for wireless local area networks (WLANs). Wireless Ethernet HIPERLAN-2 is also based on OFDM. Additionally, the forthcoming IEEE 802.11n standard for WLAN systems is also expected to employ some form of OFDM. Those skilled in the art will recognize, however, that the methods and systems described herein are equally applicable to other modulation, transmission and demodulation schemes.

An OFDM baseband symbol is the sum of a number of orthogonal subcarriers, sometimes referred to herein as channels or tones. Each tone is independently modulated by its own data, and thus carries its own data constellation. The modulation schemes may differ, but are typically some type of quadrature amplitude modulation (QAM), complimentary code keying (CCK), or phase shift keying (PSK). Other modulation schemes are within the scope of the invention. A composite baseband signal is typically used to modulate a main radio frequency (RF) carrier having a carrier frequency ($f_c$). OFDM modulation and demodulation are usually implemented with fast Fourier transform (FFT) techniques. When OFDM is used in conjunction with channel coding techniques, it is described as coded OFDM or COFDM.

Each data packet in a WLAN signal using OFDM has a payload portion that includes a number of data symbols. A typical OFDM data symbol uses 20 Mhz of bandwidth and is typically composed of about 52 sub-carriers or tones. There are two types of active tones—data tones and pilot tones. Typically four pilot tones are interspersed among 48 data carrying tones. The pilot tones are typically used as a phase reference. OFDM data packets are typically preceded by a preamble. The preamble can be used for signal detection and synchronization, and typically includes such information as data rate and packet length. Often, the preamble comprises two or more repeated preamble portions. For example, a data packet may be preceded by a short 0.8 μs preamble repeated ten times, followed by a long 3.2 μs preamble repeated two times. The above described data packet and preamble are merely exemplary. Their ultimate form and content are typically determined by whatever standards are implemented in the communications system.

In wide-area wireless broadcasting, one or more receivers can benefit from simultaneously receiving signals from several spatially dispersed transmitters. Such systems may be referred to as a multiple-input multiple-output (MIMO) system, or a multiple-input single-output (MISO) system. MIMO and MISO systems are beneficial because multiple transmitters will destructively interfere with each other only on a limited number of subcarriers or tones, whereas most subcarriers or tones will actually reinforce coverage over a wide area. However, the OFDM signal may nonetheless suffer from time-variations in the channel, which can be manifested as a carrier frequency offset (CFO). Over time, a CFO results in phase rotation of the data symbol. Left uncorrected, the frequency spectrum (and data constellation) will shift, resulting in corrupted data at the receiver output.

Another common impairment is sampling frequency offset (SFO). SFO occurs when a sampling clock is slightly offset (e.g., either slightly faster or slower) from its theoretical or expected speed. For example, a theoretical 80 MHz sampling clock may actually be sampling at 80.08 MHz, or at 79.06 MHz. Such an offset creates problems in data processing. For example, over a thousand samples at 80.08 MHz, the $1000^{th}$ sample may actually correspond to the $999^{th}$ piece of data. This is referred to as "sample slip." However, even over far fewer samples, SFO can effectively cause a small phase roll in the data constellation of a received symbol. Such a phase shift is felt linearly across each received symbol. If left unchecked, such a phase shift can corrupt the received digital information. As explained more fully below, the inventor has determined the relationship between CFO and SFO, thereby permitting effective SFO estimation and correction.

Yet another impairment common to wireless communications systems is phase noise. Phase noise arises as a result of up or down-conversion of the signal by a practical (non-ideal) radio. The effect of phase noise is randomly distributed across a received signal.

As noted above, the inventor has discovered a system and method for improving the estimation and correction of CFO, SFO and phase noise in a wireless communication system. Embodiments of the invention disclosed herein are described in the context of the above described exemplary WLAN environment using an OFDM modulation/demodulation scheme. Estimations and corrections of CFO, SFO, and phase noise are described more fully in the following sections.

II. Carrier Frequency Offset Estimation and Correction

A. Overview

As noted above, a MIMO or MISO wireless communication system employs at least one transmitter/receiver pair between which data carrying signals are exchanged. The transmitter typically encodes the digital information and modulates it onto an analog carrier signal (e.g., a radio signal). In the receiver, the received analog carrier signal, having carrier frequency ($f_c$), is down-converted to baseband, and the digital information carried thereon is demodulated and decoded. The down-conversion, demodulation and decoding takes place in the physical (PHY) layer of a receiver. It is during the demodulation process that any signal impairments must be estimated and corrected to prevent possible corruption of the carried digital information.

CFO estimation and correction can be performed at baseband in the PHY layer of the receiver. According to the invention, the CFO estimation and correction is made using both the preamble and payload portions of the received data packet. For the preamble portion, the correction is iteratively applied to successive preamble portions, and ultimately to the payload portion. For the payload portion, CFO estimates are made and averaged over frequency using multiple tones, and over time using multiple symbols. In MIMO or MISO systems, CFO estimates may also be averaged over space using receive signals from multiple, spatially diverse transmitters. CFO corrections are iteratively applied to the payload as symbols in the data packet proceed through the signal processing pipeline.

B. Detailed Description for Carrier Frequency Offset Estimation and Correction.

FIG. 1 is a block diagram of an exemplary PHY layer 100 in a receiver capable of operating in a MIMO or MISO WLAN environment. This environment is exemplary, and was chosen for ease of explanation, and not limitation. PHY layer 100 is coupled to an antenna 105, and receives one or more input analog RF carrier signals 102a-102n, upon which digital information has been modulated. PHY layer 100 includes an RF tuner 110, RF filter 115, an analog-to-digital converter 120, an RF demodulator 125, a decoder 130, and a serializer 135. The PHY layer 100 output is coupled to the media access control (MAC) layer. PHY layer 100 also includes a PHY state machine 112, which provides control functions (CONTROL) for certain programmable elements in PHY layer 100. The invention is primarily carried out in a portion of the RF demodulator 125. As noted above, the CFO estimation and correction may be made using both the preamble and payload portions of a data packet. The payload CFO estimate and correction will be described first.

1. Data CFO Estimation

Figure 2:
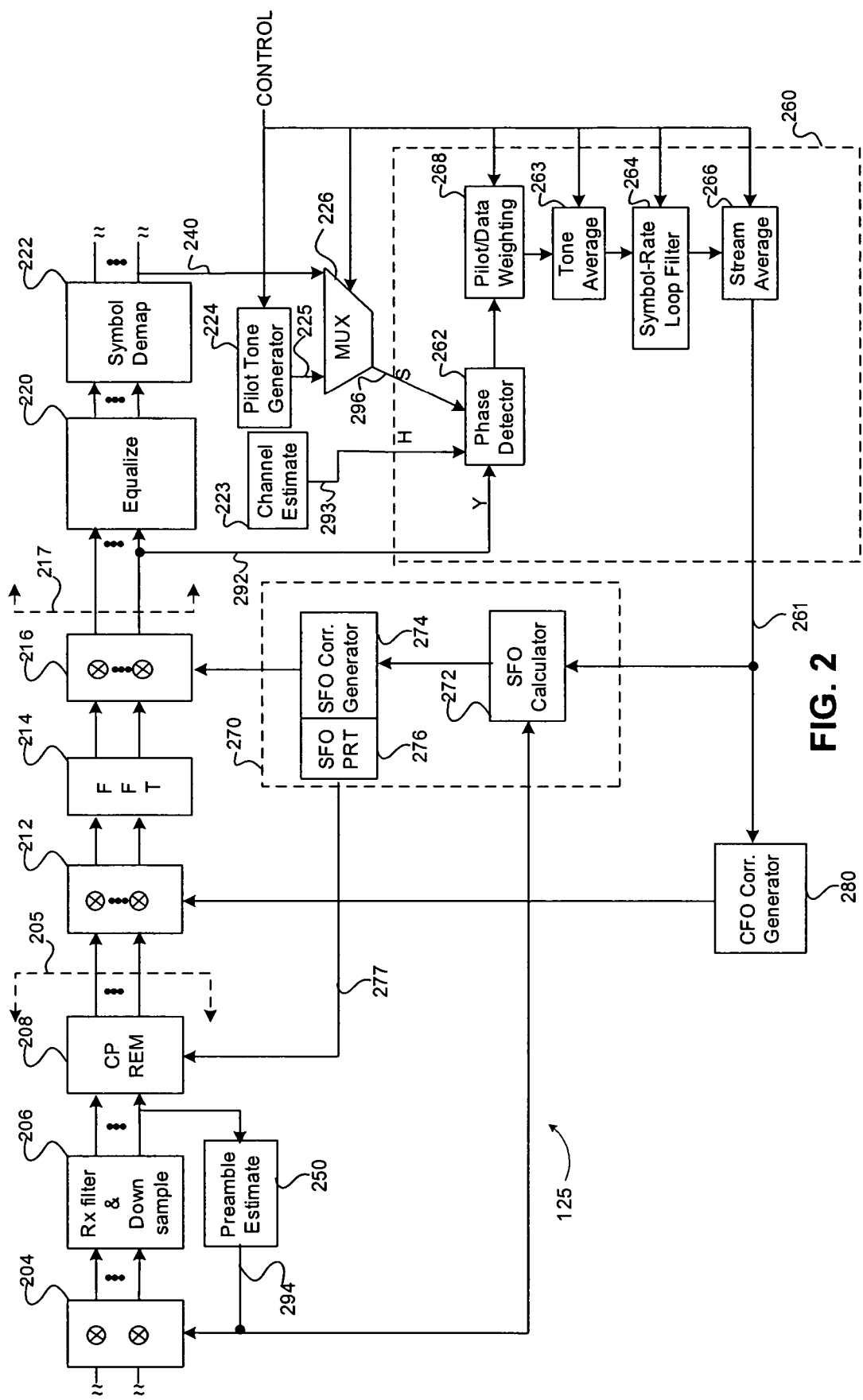

FIG. 2 is a block diagram of a portion of RF demodulator 125. The primary signal path for the received signal begins with a frequency correction block 204, and proceeds through a receive filter and down-sample module 206, a cyclic prefix removal module 208, a time-domain phase locked loop (PLL) correction block 212, a fast Fourier transform (FFT) module 214, a frequency-domain PLL correction block 216, an equalizer 220, and a symbol demapping module 222. For ease of description, the various elements in the primary signal path may be grouped into a first signal processing stage 205, which precedes the FFT module 214, and a second signal processing stage 217, which follows the FFT module 214.

As illustrated, the first signal processing stage 205 precedes the FFT module 214. This stage, the entirety of which is not specifically illustrated, is responsible for down-converting the received data stream to baseband, and preparing the signal for demodulation in the FFT module 214. As shown, the first signal processing stage 205 may include a receiver filter and down-sample module 206, and an optional cyclic prefix removal module 208. As explained more fully below, it is in the first signal processing stage 205 that the preamble portions of the data packet are used to generate a preamble CFO estimate 294. This is accomplished in the preamble estimate module 250. It should be noted that the specific components in the first signal processing stage 205 are exemplary, and are not intended to be limiting beyond what is recited in the appended claims.

The FFT module 214 is primarily responsible for demodulating the received, down-converted data stream. That is, the FFT module 214 expands the received data stream into its sinusoidal components to facilitate further signal analysis, such as symbol demapping and decoding. The time-domain PLL correction block 212 precedes the FFT module 214, while the frequency-domain PLL correction block 216 follows the FFT module 214. As explained more fully below, these PLL correction blocks are typically multipliers that allow frequency or phase corrections to be made to the received datastream as it proceeds through the signal processing portion of PHY layer 100.

The second signal processing stage 217 follows the FFT module 214, and thereafter decodes the impressed digital data for further analysis and distribution in the media access control (MAC) layer of the receiver. As shown, the second signal processing stage 217 may include equalizer 220 and symbol demapping module 222. As with the first signal processing stage 205, the specific components of the second signal processing stage 217 described above are exemplary, and are not intended to be limiting beyond what is recited in the appended claims.

FIG. 2 also illustrates CFO estimator 260. CFO estimator 260 is essentially a phase locked loop (PLL) that receives input from the second processing stages 217, and is coupled in parallel with the FFT module 214. Generally, a PLL is a closed loop frequency control system, that uses feedback to maintain an output signal in a specific phase relationship with a reference signal. The CFO estimator includes a phase detector 262, A pilot/data weighting module 268, a tone average module 263, a symbol-rate loop filter module 264, and a stream average module 266. Each of these modules receives a CONTROL signal from the PHY state machine 112, whereby their operation maybe programmed. As described more fully below, phase detector 262 produces an output signal that is proportional to a phase difference its two input signals. The symbol rate loop filter 264 module may include a voltage controlled oscillator (VCO)/integrator, which is a circuit that produces an ac output signal whose frequency is proportional to the input voltage. The symbol-rate loop filter 264 is programmable circuit used to control the CFO estimator (PLL) dynamics and system performance. One skilled in the art would be familiar with the functions of various PLL circuit elements.

The CFO estimator 260 also includes a number of averaging modules. More specifically, CFO estimator 260 includes a pilot/data weighing module 268, a tone averaging module 263, a and a stream averaging module 266. These programmable averaging modules may be used to further refine the initial CFO estimation generated by phase detector 262.

Generally, CFO estimator 260 accepts three input signals. These inputs, as described more fully below, represent a received signal 292 from second signal processing stage 217, a channel CFO estimate 293 from the channel estimate module 223, and a weighted transmitted signal estimate 296 from multiplexer 226. As explained more fully below, multiplexer 226 assigns an appropriate weight to each transmitted signal estimate (i.e., pilot tone estimate 225 or data tone estimate 240) according to a programmable control signal from the PHY state machine 112. Alternatively, these weights may be assigned by the pilot/data weighing module 268. In an embodiment, pilot tone estimates 225 are weighted more heavily than data tone estimates 240. It should be noted that the particular configuration of the CFO estimator 260, and the manner in which it receives the input signals is merely exemplary. Other configurations could be devised by one of skill in the art with out departing from the spirit and scope of the invention.

To facilitate further description of the operation of CFO estimator 260, the following equations and mathematical conventions are provided. Again, it should be noted that these mathematical conventions are abstract representations, not physical models. As such, they do not represent the actual propagation and impairment of the signal.

The $n^{th}$ transmitter in a MIMO or SIMO system sends a signal impaired by phase noise and CFO as follows:

$$x_n(t) = e^{j2\pi\Delta f_{tx}t} e^{j\theta_n(t)} s_n(t) \quad (1)$$

where $x_n(t)$ is the received signal, $e^{j2\pi\Delta f_{tx}t} e^{j\theta_n(t)}$ is the phase noise component, and $s_n(t)$ is the transmitted signal.

Making the conservative assumption that the phase noise is uncorrelated across a number (N) of transmit antennas, but that the CFO is correlated across the same antennas, the vector representation of the received signal becomes:

$$\begin{bmatrix} x_1(t) \\ x_2(t) \\ \vdots \\ x_N(t) \end{bmatrix} = e^{j2\pi\Delta f_{tx}t} \begin{bmatrix} e^{j\theta_1(t)} & 0 & \cdots & 0 \\ 0 & e^{j\theta_2(t)} & \cdots & 0 \\ \vdots & & \ddots & \vdots \\ 0 & 0 & \cdots & e^{j\theta_N(t)} \end{bmatrix} \begin{bmatrix} s_1(t) \\ s_2(t) \\ \vdots \\ s_N(t) \end{bmatrix} \quad (2)$$

Imperfect sampling or SFO causes an additional impairment. Assuming that the SFO is correlated across the N transmit antennas, the sampled transmit signal becomes:

$$\begin{bmatrix} x_1(qT_s) \\ x_2(qT_s) \\ \vdots \\ x_N(qT_s) \end{bmatrix} =$$

$$e^{j2\Delta f_{tx}qT_s} \begin{bmatrix} e^{j\theta_1(qT_s)} & 0 & \cdots & 0 \\ 0 & e^{j\theta_2(qT_s)} & \cdots & 0 \\ \vdots & & \ddots & \vdots \\ 0 & 0 & \cdots & e^{j\theta_N(qT_s)} \end{bmatrix} \begin{bmatrix} s_1(q(T_s + \Delta T_s)) \\ s_2(q(T_s + \Delta T_s)) \\ \vdots \\ s_N(q(T_s + \Delta T_s)) \end{bmatrix} \quad (3)$$

where $(T_s + \Delta T_s)$ is the SFO component.

Figure 3A:
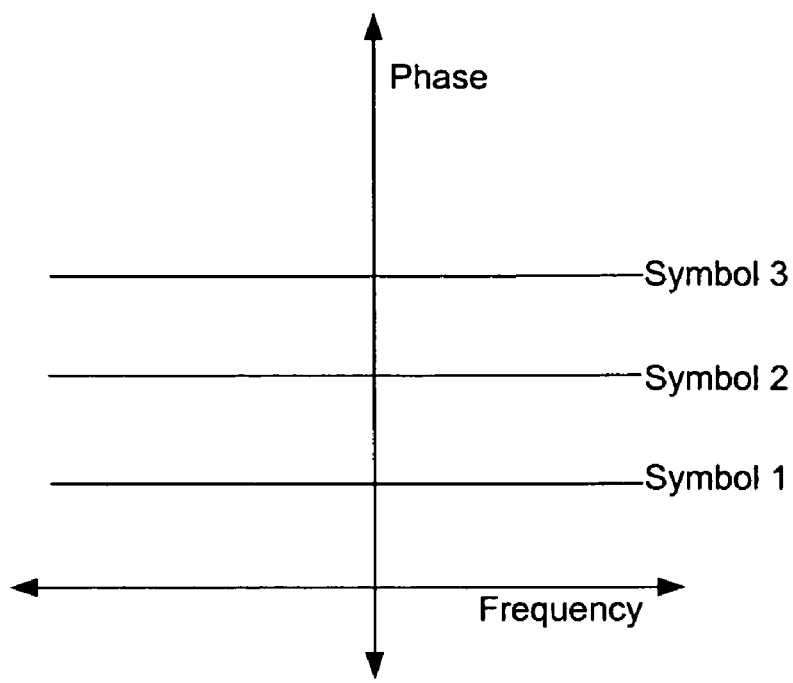
FIGS. 3A and 3B illustrate how various signal impairments affect the phase of a signal in a wireless communications system.
Figure 3B:
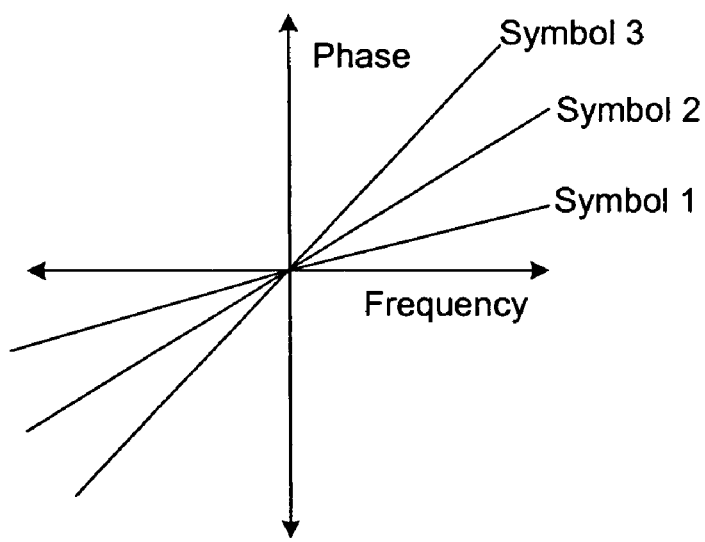

Over a single symbol, phase noise ($e^{j\theta n(qTs)}$) can be approximated as constant over one symbols time ($e^{j\theta_{n,1}}$). This corresponds to a flat phase shift in the frequency domain. If it is further assumed that the residual CFO for the $l^{th}$ symbol is small, then the CFO can be approximated by a flat phase shift, as illustrated in FIG. 3A. Finally, if it is assumed that the SFO is small, then the SFO can be approximated by a linear phase shift in the frequency domain, as illustrated in FIG. 3B. The frequency-domain representation of the $k^{th}$ tone of the $l^{th}$ transmitted symbol is thus:

$$\begin{bmatrix} X_{1,k}^l \\ X_{2,k}^l \\ \vdots \\ X_{N,k}^l \end{bmatrix} \approx \quad (4)$$

$$e^{\frac{j2\pi\Delta f_{tx}(2l-1)T}{2}} e^{\frac{j2\pi k\Delta T_{s,tx}(2l-1)}{2T_s}} \begin{bmatrix} e^{j\theta_{1,l}} & 0 & \cdots & 0 \\ 0 & e^{j\theta_{2,l}} & \cdots & 0 \\ \vdots & & \ddots & \vdots \\ 0 & 0 & \cdots & e^{j\theta_{N,l}} \end{bmatrix} \begin{bmatrix} S_{1,k}^l \\ S_{2,k}^l \\ \vdots \\ S_{N,k}^l \end{bmatrix}$$

The receiver phase noise operates on the transmitted signals in a similar way. Thus:

$$\begin{bmatrix} Y_{1,k}^l \\ Y_{2,k}^l \\ \vdots \\ Y_{N,k}^l \end{bmatrix} \approx e^{j\frac{2\pi\Delta f_{tx}(2l-1)T}{2}} e^{j\frac{2\pi k\Delta T_{s,rx}(2l-1)}{2T_s}} \begin{bmatrix} e^{j\phi_{1,l}} & 0 & \cdots & 0 \\ 0 & e^{j\phi_{2,l}} & \cdots & 0 \\ \vdots & & \ddots & \vdots \\ 0 & 0 & \cdots & e^{j\phi_{N,l}} \end{bmatrix}$$ (5)

$$\begin{bmatrix} H_{11,k} & H_{12,k} & \cdots & H_{1N,k} \\ H_{21,k} & H_{22,k} & \cdots & H_{2N,k} \\ \vdots & & \ddots & \vdots \\ H_{M1,k} & H_{M2,k} & \cdots & H_{MN,k} \end{bmatrix} \begin{bmatrix} X_{1,k}^l \\ X_{2,k}^l \\ \vdots \\ X_{N,k}^l \end{bmatrix}$$

Using the following shorthand notation:

$$e^{j\lambda k(2l-1)} = e^{\frac{j2\pi(\Delta T_{s,tx} + \Delta T_{s,rx})k(2l-1)}{2T_s}}$$ (6)

$$e^{j\psi(2l-1)} = e^{\frac{j2\pi(\Delta f_{tx} + \Delta f_{rx})k(2l-1)T}{2}}$$ (7)

$$\beta_{n,l} = e^{j\theta_{n,l}}$$ (8)

$$\alpha_{m,l} = e^{j\phi_{m,l}}$$ (9)

$$\gamma_{mn,l} = e^{j\psi(2l-1)}\alpha_{m,l}\beta_{n,l}$$ (10)

the relationship between the impaired received signal vector [Y] and the pure transmitted signal vector [S] (omitting the l subscripts on $\alpha$, $\beta$ and $\gamma$ as well as the k subscript on $H_{MN}$ for readability) is:

$$\begin{bmatrix} Y_{1,k}^l \\ Y_{2,k}^l \\ \vdots \\ Y_{M,k}^l \end{bmatrix} = e^{j\psi(2l-1)}e^{j\lambda k(2l-1)} \begin{bmatrix} \alpha_1 & 0 & \cdots & 0 \\ 0 & \alpha_2 & \cdots & 0 \\ \vdots & & \ddots & \vdots \\ 0 & 0 & \cdots & \alpha_M \end{bmatrix} \begin{bmatrix} H_{11} & H_{12} & \cdots & H_{1N} \\ H_{21} & H_{22} & \cdots & H_{2N} \\ \vdots & & \ddots & \vdots \\ H_{M1} & H_{M2} & \cdots & H_{MN} \end{bmatrix}$$ (11)

$$\begin{bmatrix} \beta_1 & 0 & \cdots & 0 \\ 0 & \beta_2 & \cdots & 0 \\ \vdots & & \ddots & \vdots \\ 0 & 0 & \cdots & \beta_N \end{bmatrix} \begin{bmatrix} S_{1,k}^l \\ S_{2,k}^l \\ \vdots \\ S_{N,k}^l \end{bmatrix}$$

$$= e^{j\psi(2l-1)}e^{j\lambda k(2l-1)} \begin{bmatrix} \alpha_1\beta_1 H_{11} & \alpha_1\beta_2 H_{12} & \cdots & \alpha_1\beta_N H_{1N} \\ \alpha_1\beta_1 H_{21} & \alpha_1\beta_2 H_{22} & \cdots & \alpha_2\beta_N H_{1N} \\ \vdots & & \ddots & \vdots \\ \alpha_M\beta_1 H_{M1} & \alpha_M\beta_2 H_{M2} & \cdots & \alpha_M\beta_M H_{MN} \end{bmatrix} \begin{bmatrix} S_{1,k}^l \\ S_{2,k}^l \\ \vdots \\ S_{N,k}^l \end{bmatrix}$$ (12)

In terms of phase offset ($\gamma_{mn}$), the following relationship emerges for a MIMO system:

$$\begin{bmatrix} Y_{1,l}^l \\ Y_{2,k}^l \\ \vdots \\ Y_{M,k}^l \end{bmatrix} =$$ (13)

$$e^{j\lambda k(2l-1)} \begin{bmatrix} \gamma_{11}H_{11} & \gamma_{12}H_{12} & \cdots & \gamma_{1N}H_{1N} \\ \gamma_{21}H_{21} & \gamma_{22}H_{22} & \cdots & \gamma_{2N}H_{2N} \\ \vdots & & \ddots & \vdots \\ \gamma_{M1}H_{M1} & \gamma_{M2}H_{M2} & \cdots & \gamma_{MN}H_{MN} \end{bmatrix} \begin{bmatrix} S_{1,k}^l \\ S_{2,k}^l \\ \vdots \\ S_{N,k}^l \end{bmatrix}$$

where the [Y] vector comprises received signals 292 at the $M^{th}$ receiver, for the $k^{th}$ tone, and for the $l^{th}$ symbol. The [H] vector represents an estimated signal impairment (e.g., CFO or SFO) between a receiver/transmitter pair (M,N), with $\gamma$ representing the phase offset. The [S] vector comprises the transmitted signal estimate 296 from the $N^{th}$ transmitter, for the $l^{th}$ symbol and, for the $k^{th}$ tone.

If a vector [Z] is established as being the product of [H] and [S] from equation 13, and we solve equation for phase offset $\gamma$, the phase offset $\gamma$ may be represented by the inverse [Z] matrix multiplied by vector [Y].

$$\gamma \approx 1/[Z] \cdot [Y]$$ (14)

It should be noted that the above mathematical description provides a convenient model of CFO, SFO and phase noise. However, they are not physical models, and therefore do not represent the actual propagation and impairment of the signal. Nonetheless, the above described mathematical model is useful for illustrative purposes and will be referred to at points in the following description.

Figure 4A:
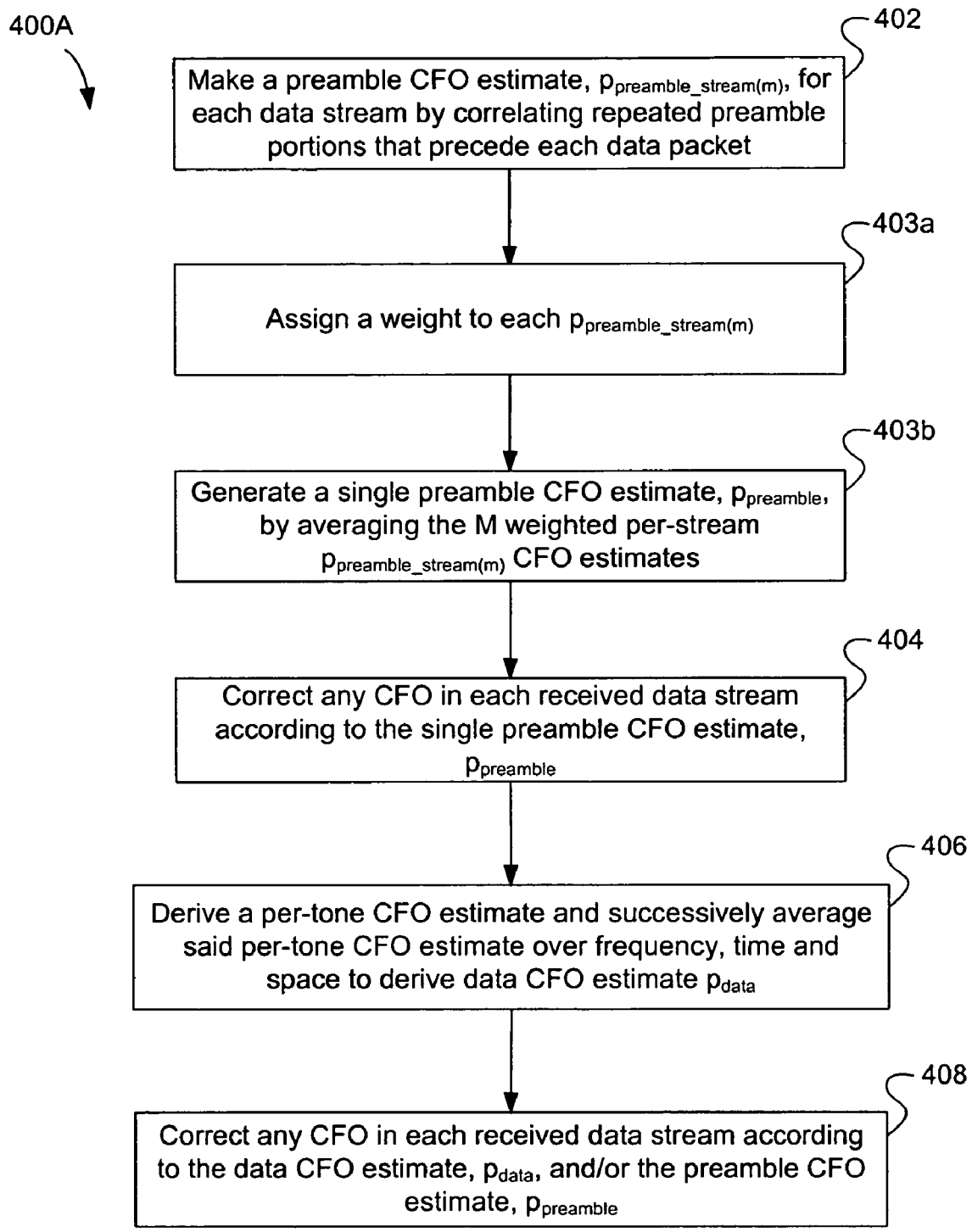
FIGS. 4A and 4B illustrate a method of estimating and correcting CFO in a received signal.
Figure 4B:
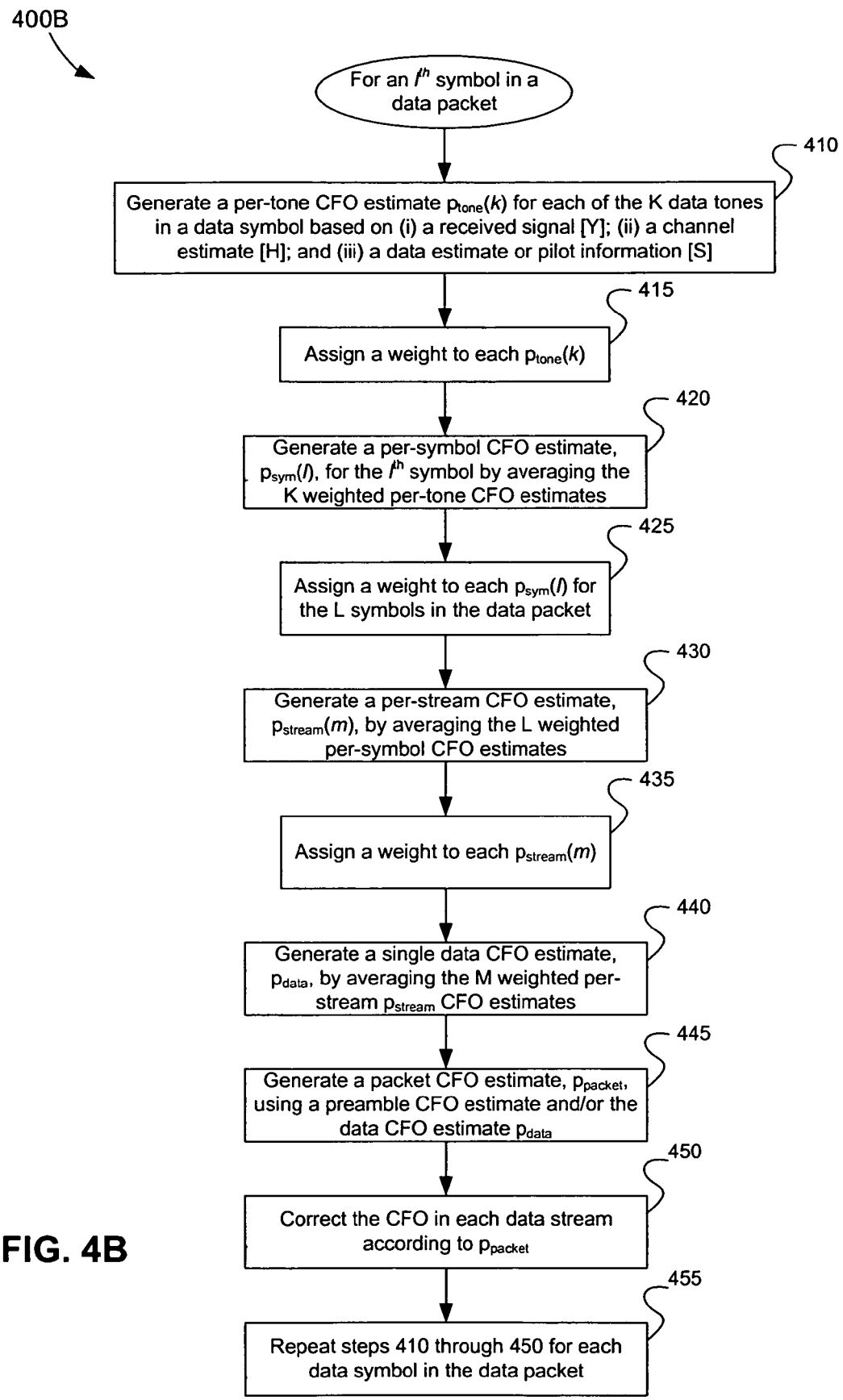

With equation 14 in mind, a general method of estimating and correcting CFO in a receiver operating in the above described exemplary WLAN environment is now described in FIGS. 4A and 4B. As noted above, the received data packet includes multiple data streams. Each data packet has a preamble having a number of preamble portions. The preamble is followed by payload that includes a number of data symbols L. Each $l^{th}$ data symbol, in turn, has a number of tones K. Each $k^{th}$ tone carries its own unique data. In a MIMO or SIMO system, there are a number M of received data streams in each data packet.

Generally, the methods 400A and 400B involve, for each data symbol, making both a preamble CFO estimate and a per-tone CFO estimate. An initial CFO correction is made based on the preamble CFO estimate. Then, for an $l^{th}$ symbol in a data packet, the per-tone CFO estimate is averaged across frequency, time and space to generate a data CFO estimate, $p_{data}$. CFO in the receiver is then updated using the $p_{data}$ estimate, and/or the preamble CFO estimate, $p_{preamble}$. The steps are repeated for each $l^{th}$ data symbol in the data packet.

More specifically, method 400A begins with step 402, where a preamble CFO estimate, $p_{preamble\_stream(m)}$, is made by correlating repeated preamble portions that precede each data packet. The derivation of a preamble estimate is described more fully below in section 2. In step 403a, a weight is assigned to each $p_{preamble\_stream(m)}$. Thereafter, a single preamble CFO estimate, $p_{preamble}$, is generated by averaging the M weighted per-stream $p_{preamble\_stream(m)}$ CFO estimates, according to step 403b.

An initial CFO correction is then made based on the single preamble CFO estimate $p_{preamble}$, according to step 404. Next, according to step 406, a per-tone CFO estimate is successively averaged over frequency, time and space to derive a data CFO estimate $p_{data}$. Step 406, as explained more fully below, is repeated for each $l^{th}$ data symbol. Finally, according to step 408, any CFO in each received data stream is then corrected according to the data CFO estimate, $p_{data}$, and/or the preamble CFO estimate $p_{preamble}$.

FIG. 4B describes in more detail how the CFO estimate is successively averaged over frequency, time and space to generate a final CFO estimate that is applied to the receiver. For ease of description, method 400B is described with reference to the mathematical conventions described above, in view of FIG. 2. Nonetheless, as noted above, these mathematical conventions and reference to FIG. 2 should not be construed as limiting beyond what is recited in the appended claims.

The method 400B begins with step 410 where, for an $l^{th}$ symbol in a data packet, a per-tone CFO estimate $p_{tone}(k)$ is generated for each of the K data tones in the data symbol. This per-tone CFO estimate is based on (i) a received signal [Y]; (ii) a channel estimate [H]; and (iii) a data estimate or pilot information [S]. As illustrated in FIG. 2, a control signal (CONTROL) to an exemplary multiplexer 226 provides one method of selecting whether the data 240 or pilot 225 information is to be combined with the channel estimate [H] 291 and the received signal [Y] 292. Use of the multiplexer 226, however, is merely exemplary, and one of skill in the art could envision other methods for selecting between the data and pilot information, as necessary.

A weight is selectively assigned to each of the K per-tone CFO data estimates in accordance with step 415. The tone weights are based on channel conditions. As noted above, individual tones may be data tones, or pilot tones. Data tones carry the digital data constellation that has been modulated onto them, while the pilot tones carry predetermined, known data constellations. Thus, the estimates for the transmitted tones may be made from either data tones or pilot tones.

If the estimate is made from the data tone, then it is taken from the output of symbol demapping module 222, which uses well known decision directed techniques to estimate the contents of the data tone. Such known techniques include making a "nearest neighbor" estimate on individual data points in a data constellation, or by providing "decision boundaries" for each point in the data constellation. If the tone estimate [S] is made from the pilot tones, then the estimate is taken from a pilot generator 224, which simply provides the known data for the pilot tone.

In an embodiment, the pilot tone estimates are weighted more heavily than the data tone estimates. In an exemplary embodiment, multiplexer 226 assigns an appropriate weight to each transmitted signal estimate according to a programmable control signal CONT from the PHY state machine 112. However, one of skill in the art could envision other methods for assigning an appropriate weight to the K per-tone CFO estimates. For example, a pilot/data weighting module 268 could be provided after phase detector 262 to assign appropriate weights to the per-tone CFO estimates.

In an embodiment, the weighted transmitted tone estimate 296 [S] is received into phase detector 262, along with a channel CFO estimate 293 [H]. These signals may be combined in phase detector 262—for instance, with a multiplier—and may be represented mathematically by vector [Z] in equation 14. As such, this vector would represent a refined, per-tone, transmitted signal estimate. Also received at phase detector 262 is received data signal 292. Received data signal 292 may be represented by vector [Y] in equation 14, and can be taken from the output of frequency domain PLL correction block 216, prior to the estimates made by in symbol demapping module 222.

As illustrated in FIG. 3A, the phase offset due to CFO is essentially constant across individual data symbols. Thus, according to step 420, a per-symbol CFO estimate, $p_{sym}(l)$ is next generated for the $l^{th}$ symbol by averaging the K weighted per-tone CFO estimates. This is accomplished by tone average module 263. The per-symbol CFO estimate represents an average CFO over the frequency bandwidth occupied by the K tones in the data symbol.

In steps 425 and 430, a second weighted average is calculated. According to step 425, a weight is selectively assigned to each of the l per-symbol CFO estimates generated in step 420. Next, according to step 430, the weighted l per-symbol CFO estimates are averaged to generate a data stream CFO estimate, $p_{stream}(m)$. The data stream CFO estimate, $p_{stream}(m)$, thus represents an average CFO over time as data packets proceed through the signal processing pipeline. The averaging is accomplished by symbol-rate loop filter module 264. In an embodiment, the most recent per-symbol CFO estimates are successively given the highest weight, while the weight given to older per-symbol estimates are successively diminished, each time the data stream CFO estimate, $p_{stream}(m)$, is calculated.

If there are multiple received data streams M, as in a MIMO or SIMO communications system, then steps 410-430 are repeated for each M data stream to generate M data stream CFO estimates, $p_{stream}(m)$, according to steps 435 and 440. In step 435, a weight is assigned to each m per-stream CFO estimate. The relative weights are assigned based on channel conditions using, for example, the signal quality in the channel. A higher weight would be assigned to channels with a higher signal quality. According to step 440, the M data stream CFO estimates are then averaged to generate a single data CFO estimate, $p_{data}$. The data CFO estimate, $p_{data}$, essentially amounts to averaging the CFO over space—i.e., over two or more spatially diverse transmitters. The averaging is accomplished by stream average module 266.

Recall from above that the data packet has both a data portion and a preamble portion. The data CFO estimate, $p_{data}$, generated above in steps 410 to 440 may be used with the preamble CFO estimate to generate or update a packet CFO estimate, $p_{packet}$. Depending on channel conditions and system behavior, the packet CFO estimate, $p_{packet}$, may comprise either the preamble CFO estimate, the data CFO estimate, or a combination of both. Ideally, the most reliable CFO estimate—typically the preamble CFO estimate—would be used. However, a noisy environment or a bad channel could dictate using the data CFO estimate, or a combination of both. Thus, according to step 445, a packet CFO estimate, $p_{packet}$, is generated using the preamble CFO estimate, and/or the data CFO estimate, $p_{data}$.

Finally, according to step 450, the CFO in each data stream is corrected according to the packet CFO estimate $p_{packet}$. The correction is applied by the CFO correction generator 280, which receives the output of CFO PLL 260 and applies it to the time domain PLL correction block 212. Correction block 212 can be implemented as a multiplier that, in an embodiment, precedes FFT module 214. As can be seen, although the CFO estimate is accomplished with demodulated data (i.e., post FFT data), the frequency correction is applied prior the FFT operation. Steps 410 through 450 are repeated for each data symbol in the data packet, according to step 455.

In sum, for an $l^{th}$ data symbol in a data packet, a per-tone CFO estimate is made for each of the K tones in the data symbol, and successively averaged over frequency, time and space to generate a data CFO estimate. The data CFO estimate may be combined with a preamble CFO estimate (see below) to update a packet CFO estimate. The packet CFO estimate is then applied to the data stream passing through the signal processing pipeline. In this fashion, after only a few data symbols have passed through the signal processing pipeline, any carrier frequency should be substantially eliminated, thereby permitting accurate demapping and decoding of the digital data impressed thereon.

2. Preamble CFO Estimation and Correction

As part of the overall system CFO estimation and correction process, a preamble CFO estimate may be made using the data packet preamble. Each data packet is preceded by a preamble. The preamble has repeated preamble portions. For example, a data packet may be preceded by a short 0.8 μs preamble repeated ten times, followed by a long 3.2 μs preamble repeated two times. The ultimate form and content of the preamble are typically determined by whatever standards are implemented in the communications system. Regardless of the particular form of the preamble, the contents of the repeated preambles are substantially identical. This allows repeated preambles to be compared to each other over time and, if a phase roll is detected, a rough estimate of CFO may be obtained.

To make a preamble CFO estimate, repeated preamble portions are correlated. For ease of explanation, the correlation may be described mathematically as follows. Assume that a first received data signal $X_1$ may be represented by $X_1 = S_1 e^{j2\pi(fc)(Ts)} + V_1$. Where $S_1$ is the transmitted sample, $f_c$ is the combined transmitted and received center frequency of the analog carrier signal, $T_s$ is the sampling rate, and $V_1$ is a noise term. A second received sample of a substantially identical portion of a successive repeated preamble portion may be represented by $X_{N+1} = S_1 e^{j2\pi(fc)(N+1)(Ts)} + V_2$. A correlation of the samples yields $X_1^* X_{N+1} |S_1| = |^2 e^{j2\pi(fc)(Ts)N} + V_1 \cdot S_1 e^{j2\pi(fc)(N+1)(Ts)}$. As can be seen, the phase argument in each of the correlated terms is $2\pi(f_c)(Ts)N$. Thus, if the correlation of successive samples is summed over repeated portions of the preamble, that summation will be essentially equal to the phase argument $2\pi(f_c)(Ts)N$. Because N and Ts are known quantities, one can solve for actual $f_c$ and compare it to the theoretical $f_c$ to make a preamble estimate of CFO.

In a MIMO or SIMO system, there are multiple, substantially identical received data streams from spatially diverse transmitters. This allows the preambles in the M data streams to be correlated and summed in the same fashion as repeated preambles in a single data stream. Furthermore, the preamble based estimates for each of the M data streams may be weighted according to received signal quality estimates before combining into a single CFO estimate. The preamble CFO estimates from received signals having a better signal quality would be weighted higher than preamble CFO estimates from received signals having a lower signal quality. This allows further refinement of the preamble CFO estimate in a MIMO or SIMO system.

The preamble CFO estimate can be applied to successive portions of the data packet. The successive portion of the data packet may be the payload portion. Alternatively, the successive portion of the data packet may be a successive preamble portion. Either way, such a correction permits progressively narrowing CFO in the network as the data packets proceed through the first signal processing stage 205.

III. Sampling Frequency Offset Estimation and Correction

As described above, another common impairment is sampling frequency offset (SFO). SFO estimation and correction is also described in a commonly owned, copending application entitled "Apparatus and Method for Sampling Frequency Offset Estimation and Correction in a Wireless Communication System," Ser. No. 11/312,510, filed Dec. 21, 2005, which is hereby incorporated by reference in its entirety.

SFO occurs when a sampling clock is slightly offset (e.g., either slightly fast or slow) from the desired or theoretical sampling rate. For example, a theoretical 80 MHz sampling clock may actually be sampling at 80.08 MHz, or at 79.06 MHz. Such an offset creates problems in data processing. For example, over a thousand samples at 80.08 MHz, the $1000^{th}$ sample may actually correspond to the $999^{th}$ piece of data. This is referred to as "sample slip." Sample slip may occur in either a positive or negative direction, depending on the cumulative direction of phase roll. However, even over far fewer samples, SFO can effectively cause a small phase roll in the data constellation of a received symbol. As illustrated in FIG. 3B, such a phase shift is felt linearly across each received symbol. If left unchecked, such a phase shift can corrupt the received digital information, especially at the outer ends of the symbol bandwidth.

The inventors recognized a relationship between CFO and SFO that permits effective SFO estimation and correction. In a communications system such as the exemplary OFDM WLAN described above, there is typically a single crystal oscillator clock from which other system clocks are derived. Therefore, in such a system, the same crystal oscillator drives both the sampling frequency ($f_s$) and the carrier frequency ($f_c$). In such systems, the SFO can be expected to be of a substantially identical proportion of the theoretical $f_s$, as CFO is of the theoretical $f_c$. Put differently, if CFO and SFO were to be expressed in parts-per-million, the their value would be substantially identical. This relationship permits effective estimation and correction of SFO, where CFO is known.

Returning to FIG. 2, a system for estimating and correcting SFO is illustrated. As fully described above, FIG. 2 shows a preamble estimate module 250 that uses the preamble portion of the data packet to make a preamble CFO estimate. FIG. 2 also shows the CFO estimator 260, which further refines the CFO estimates by, for each symbol, first making a per-tone CFO estimate, and successively averaging it over time, frequency and space (if necessary) to further refine and produce a data CFO estimate. The output of the CFO estimator 260 thus represents a data CFO estimate, $p_{data}$. The above described method of estimating CFO may be implemented in the present invention. However, the present invention is not so limited, and other methods of estimating CFO known in the art may be used as well.

FIG. 2 further illustrates an SFO correction module 270 that is coupled to the output CFO estimator 260. SFO correction module 270 includes an SFO calculator 272 that uses the assumed relationship between CFO and SFO to generate an SFO estimate. As described above, SFO is approximately equal to the theoretical $f_s$ multiplied by the CFO estimate 261 (from CFO estimator 260) and divided by the theoretical $f_c$. An SFO phase correction generator 274 is coupled to SFO calculator 272. SFO correction generator 274 receives the SFO estimate, generates an SFO phase correction, and applies it to the received data stream. In an embodiment, the SFO phase correction is applied to the frequency domain PLL correction block 216, which follows FFT module 214, to achieve a phase roll in the opposite direction as the estimated SFO. In an alternate embodiment (not illustrated), the SFO phase correction may be applied to the data stream as a time correction ($\Delta T_s$) by using a linear interpolator. Such a correction would typically be applied prior to FFT module 214. A time shift by $\Delta T_s$ ensures that the data is sampled at ideal points on the data constellation.

SFO phase correction generator 274 also includes an SFO rotor 276. SFO rotor 276 is used to track overall phase roll. As noted above, if overall phase roll due to SFO reaches a certain threshold value, sometimes referred to as a "guard interval," sample slip can occur. In other words, as the SFO causes the linear phase roll across symbols, the data or pilot tones at the edges of the symbol bandwidth become offset to a degree that is beyond the decision boundary of symbol demapping module 222. At a certain threshold value (typically approximately one half the sample spacing ($T_s/2$)) the SFO phase roll tracker (PRT) 276 sends a signal 277 to cyclic prefix removal module 208, instructing it to either advance or retard a data sample. This may be accomplished by rotating the data signal by 360 degrees in the desired direction. For example, the sample may be advanced by rotating the phase of the received data stream by negative 360 degrees when the phase roll is greater, in a negative direction, than the predetermined guard interval. Alternatively, the sample may be retarded by rotating the phase of the received data stream by positive 360 degrees when the phase roll is greater, in a positive direction, than the predetermined guard interval. As illustrated in FIG. 2, cyclic prefix removal module 208 follows the receive filter and downsample module 206.

Figure 5:
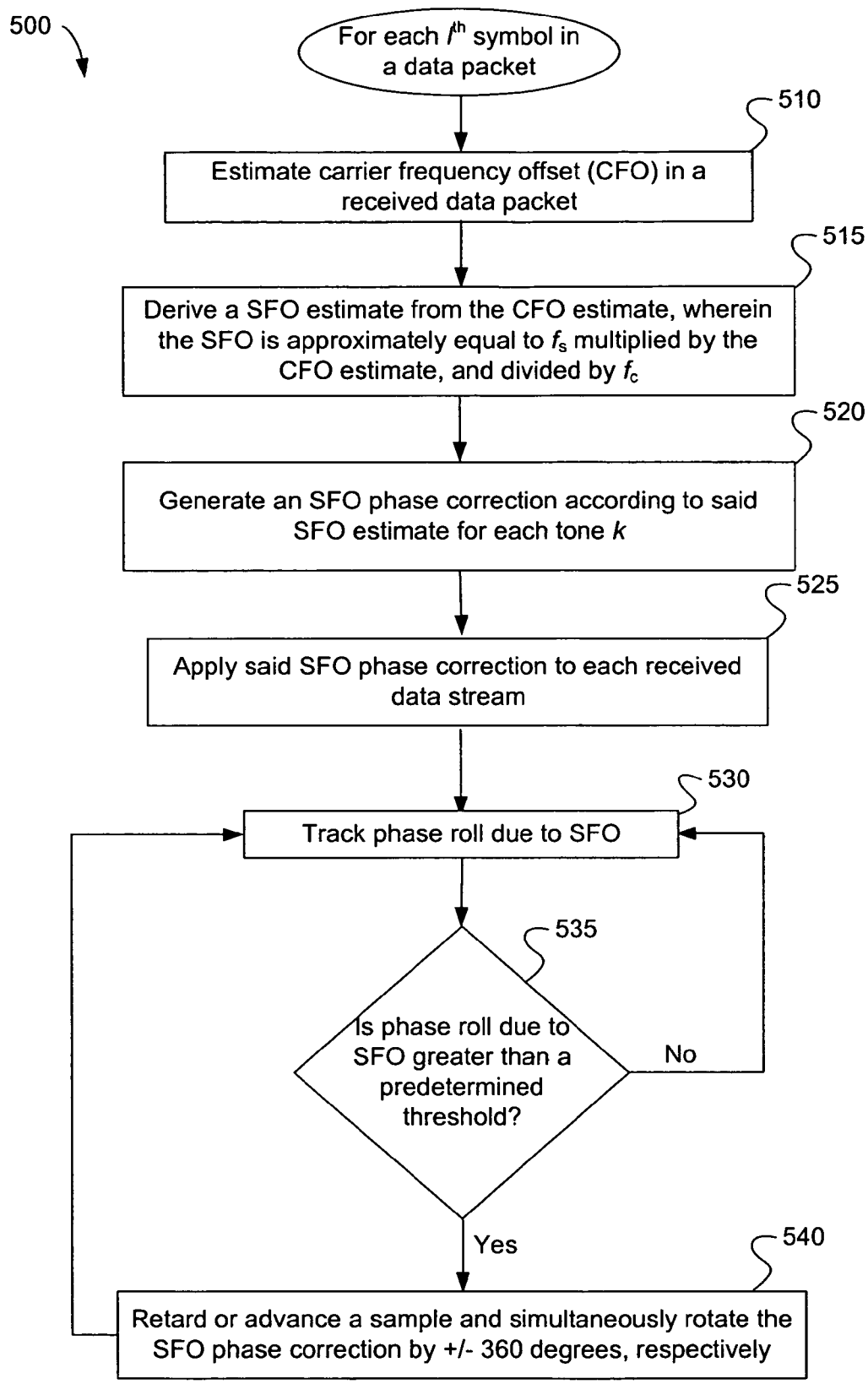
FIG. 5 illustrates a method of estimating and correcting SFO in a received signal.

FIG. 5 illustrates a method 500 for estimating and correcting SFO in a received data stream. As with the CFO correction method, method 500 is accomplished for each $l^{th}$ symbol in a data packet. As noted, the described method presumes that $f_c$ and $f_s$ are driven by a common clock source, such as a crystal oscillator. According to step 510, an estimate is made of the CFO in the received data packet. Two methods of estimating CFO are fully described above. However, other methods of estimating CFO are known in the art, and may be used as well.

In step 515, an SFO estimate is derived from the CFO estimate. As described above, where $f_c$ and $f_s$ are driven by a common clock source, the SFO can be expected to be of a substantially identical proportion of the theoretical $f_s$, as CFO is of the theoretical $f_c$. More specifically, SFO is approximately equal to the theoretical $f_s$ multiplied by said CFO estimate, and divided by the theoretical $f_c$. The SFO estimate may be derived from either the preamble CFO estimate 294, the data CFO estimate 261, or another known method for estimating CFO.

An SFO phase correction is generated in step 520 for each $k^{th}$ tone, according to the derived SFO estimate. Given the above described relationship between CFO and SFO, a determination is made on how far, and in which direction, a corrective phase roll is to be applied to the data streams passing through the primary digital signal processing pipeline.

In an embodiment, and according to step 525, SFO is corrected in each received data stream using the frequency domain PLL correction block 216 that follows FFT module 214. Application of the SFO phase correction causes a phase roll in each received data stream that corrects small SFOs. Alternatively, an interpolation filter (not shown) could be employed to shift the sample in time according to the derived SFO estimate. This would have the effect of ensuring that the sample points match up to ideal points in the data constellations embodied in the plurality of data tones. Such an interpolation filter would typically be employed prior to FFT module 214. In any event, the SFO phase correction generator 274 ensures that the SFO correction is in an appropriate form, depending on the type of correction is applied.

According to step 530, phase roll due to SFO is tracked. As described above, phase roll due to SFO grows over time. If phase roll due to SFO becomes too large, sample slip may occur. Therefore, if phase role due to SFO passes a certain predetermined threshold value, then the phase of the received data stream will be rotated 360 degrees in the appropriate direction to prevent sample slip. As noted above, the threshold value is approximately equal to one half the sample interval $T_s$.

Thus, according to step 535, a determination is made as to whether the phase roll due to SFO is greater than the predetermined threshold. If the phase roll is not greater than the threshold, then sample slip is not imminent, and SFO PRT 276 continues to monitor phase roll, according to step 530. However, if the phase roll does exceed the predetermined threshold, then, according to step 540, the data stream is advanced or retarded by one sample, as appropriate. Simultaneously, the SFO phase correction is rotated by 360 degrees in the appropriate direction. If the sample is advanced, then the SFO phase correction is rotated negative 360 degrees. If the sample is retarded. Then the SFO phase correction is rotated positive 360 degrees. After the sample has been either advanced or retarded, the system returns to tracking phase roll due to SFO according to step 530.

In sum, SFO can be estimated from CFO where both $f_c$ and $f_s$ are driven by a common clock source. An SFO correction is derived from the SFO estimate, and applied to the data stream. Phase rotation due to SFO is also tracked. If the phase rotation due to SFO surpasses a threshold, then the sample is either retarded or advanced to prevent SFO induced sample slip. The SFO phase correction is simultaneously rotated by 360 degrees, as appropriate, and the system continues to track phase roll due to SFO.

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for correcting carrier frequency offset (CFO) in a communication system receiving a plurality of data packets, each data packet including multiple data streams (M), each data packet having a payload portion including a number (L) of data symbols, each data symbol having a number (K) of tones, the method comprising:

for an $l^{th}$ symbol in a data packet:
(a) generating a per-tone CFO estimate ($p_{tone}(k)$) for each of the K data tones in a data symbol based on (i) a received signal; (ii) a channel estimate; and (iii) a data estimate or pilot information;
(b) assigning a weight to each $p_{tone}(k)$;
(c) generating a per-symbol CFO estimate ($p_{sym}(l)$) for the $l^{th}$ symbol by averaging the K weighted per-tone CFO estimates;
(d) assigning a weight to each $p_{sym}(l)$ for the L symbols in the data packet;
(e) generating a per-stream CEO estimate ($p_{stream}(m)$), by averaging the L weighted per-symbol CEO estimates;
(f) assigning a weight to each $p_{stream}(m)$;
(g) generating a single data CEO estimate ($p_{data}$) by averaging the M weighted per-stream CEO estimates;
(h) generating a packet CEO estimate ($p_{packet}$) using $p_{data}$ and/or a preamble CEO estimate ($p_{preamble}$);
(i) correcting the CEO in each data stream according to $p_{packet}$;
(j) repeating steps (a) through (i) for each data symbol in the data packet.

2. The method of claim 1, wherein the K tones in each data symbol include data tones for carrying data, and pilot tones having a known data constellation, and wherein step (b) further comprises selectively assigning a first weight to a pilot tone estimate and a second weight to a data tone estimate.

3. The method of claim 2, wherein said first pilot tone weight is higher than said second data tone weight.

4. The method of claim 1, wherein step (d) further comprises selectively assigning a higher weight to a more recently calculated $p_{sym}(l)$.

5. The method of claim 1, wherein step (f) further comprises selectively assigning weights to $p_{stream}(m)$ based on signal quality, wherein higher weights are assigned to the $p_{stream}(m)$ associated with a higher quality signal stream.

6. The method of claim 1, wherein the data packet undergoes a fast Fourier transform (FFT), and wherein the estimate of step (a) is made after said FFT while the correction of step (i) is made prior to said FFT.

7. The method of claim 1, wherein each data packet is preceded by a preamble having repeated preamble portions, and wherein the repeated preamble portions are correlated to determine $p_{preamble}$.

* * * * *